(12) United States Patent
Song

(10) Patent No.: US 8,194,084 B2
(45) Date of Patent: Jun. 5, 2012

(54) DISPLAY APPARATUS AND IMAGE DISPLAY METHOD

(75) Inventor: Hee-bok Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 912 days.

(21) Appl. No.: 12/139,527

(22) Filed: Jun. 16, 2008

(65) Prior Publication Data

US 2009/0066688 A1    Mar. 12, 2009

(30) Foreign Application Priority Data

Sep. 12, 2007 (KR) .................. 10-2007-0092614

(51) Int. Cl.
*G06F 17/00* (2006.01)
(52) U.S. Cl. .................. 345/531; 345/537; 345/547
(58) Field of Classification Search .................. None
See application file for complete search history.

(56) References Cited

U.S. PATENT DOCUMENTS

| | | | |
|---|---|---|---|
| 5,790,084 A * | 8/1998 | Hix et al. .................. 345/7 |
| 6,473,811 B1 * | 10/2002 | Onsen .................. 710/15 |
| 6,629,240 B1 | 9/2003 | Lee |
| 6,779,004 B1 * | 8/2004 | Zintel .................. 709/227 |
| 6,807,629 B1 * | 10/2004 | Billick et al. .................. 713/2 |
| 7,356,679 B1 * | 4/2008 | Le et al. .................. 713/1 |
| 2005/0268008 A1 | 12/2005 | Shin |
| 2006/0114259 A1 | 6/2006 | Tseng |
| 2006/0288139 A1 | 12/2006 | Lee et al. |
| 2007/0022282 A1 | 1/2007 | Chang |
| 2007/0091096 A1 | 4/2007 | Wang et al. |
| 2008/0055835 A1 * | 3/2008 | Kumano et al. .................. 361/681 |
| 2008/0084834 A1 * | 4/2008 | Stanek .................. 370/284 |
| 2008/0288763 A1 | 11/2008 | Reik |

FOREIGN PATENT DOCUMENTS

EP    1 727 020 A2    11/2006
GB    2 415 877 A     1/2006

* cited by examiner

*Primary Examiner* — Kee M Tung
*Assistant Examiner* — Michelle Chin
(74) *Attorney, Agent, or Firm* — Sughrue Mion, PLLC

(57) ABSTRACT

A display apparatus and a method for displaying an image are provided. The display apparatus includes a memory which stores one or more images; a communication unit which receives a universal serial bus (USB) video signal transmitted via a USB cable from an external apparatus, and receives a specific command signal from the external apparatus if the external apparatus starts to boot; and a main controller which determines that the external apparatus is being booted and causes the stored images to be displayed on a screen if the command signal is received through the communication unit.

10 Claims, 3 Drawing Sheets

DISPLAY APPARATUS AND IMAGE DISPLAY METHOD

CROSS-REFERENCE TO RELATED APPLICATIONS

This application claims priority from Korean Patent Application No. 10-2007-0092614, filed on Sep. 12, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to displaying images, and more particularly, to a display apparatus and a method for displaying images stored in the display apparatus while a computer connected to the display apparatus is being booted.

2. Description of the Related Art

There is a trend for users to connect a single computer to a plurality of monitors in order to enhance the efficiency of performing tasks. Accordingly, universal serial bus (USB) monitors have increased in popularity as display apparatuses. USB monitors may be connected individually to computers via USB cables, or a plurality of USB monitors may be connected to a single computer.

However, a screen of a conventional USB monitor remains black until a computer is booted and completely activated. Specifically, the conventional USB monitor is unable to display images while the computer is being booted or when the power is not supplied from the computer. Accordingly, the screen of the conventional USB monitor stays black while the computer is booting, and thus it is impossible for a user to check the booting state of the computer. This is because a driver of the USB monitor installed on the computer needs to communicate with firmware installed on the USB monitor in order to receive video signals through a USB protocol, and because this communication is performed only when an operating system (OS) of the computer is completely activated.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus and a method capable of displaying images stored in the display apparatus while a computer is booting, so that a user may be informed that the computer is being booted.

According to an aspect of the present invention, there is provided a display apparatus comprising a memory which stores one or more images; a communication unit which receives a universal serial bus (USB) video signal transmitted via a USB cable from an external apparatus, and receives a specific command signal from the external apparatus if the external apparatus starts to boot; and a main controller which determines that the external apparatus is being booted and causes the stored images to be displayed on a screen if the command signal is received through the communication unit.

The display apparatus may further comprise a decoder which decodes the video signal transmitted from the external apparatus; and a transition minimized differential signaling (TMDS) converting unit which converts the decoded video signal into a TMDS signal. The main controller may determine that the external apparatus is being booted if the TMDS signal is not received from the TMDS converting unit.

The memory may further store a driver file of the display apparatus. The display apparatus may further comprise a memory controller which provides the command signal transmitted from the external apparatus to the main controller if the command signal is a signal to open the stored driver file of the display apparatus.

The images stored in the memory may be added and deleted.

The memory may store a notification text informing that the external apparatus is being booted. If it is determined that the external apparatus is being booted, the main controller may display at least one of the images and the notification text on the screen.

According to another aspect of the present invention, there is provided a method for displaying an image in a display apparatus which displays a universal serial bus (USB) video signal transmitted via a USB cable from an external apparatus, the method comprising receiving a specific command signal from the external apparatus if the external apparatus starts to boot; determining that the external apparatus is being booted, using the received command signal; and displaying a pre-stored image to be displayed on a screen.

The determining may comprise determining that the external apparatus is being booted, if a transition minimized differential signaling (TMDS) signal converted from the video signal is not received.

The displaying may comprise displaying at least one of the image and a pre-stored notification text on the screen.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
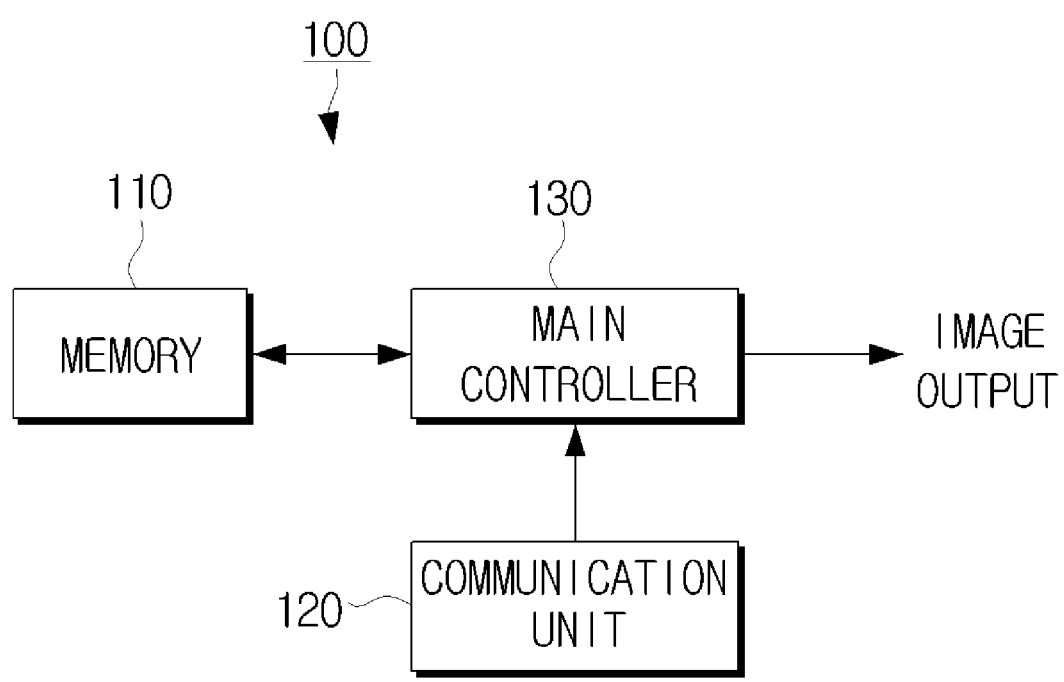
FIG. 1 is a block diagram schematically showing a display apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram schematically showing a display apparatus 100 according to an exemplary embodiment of the present invention. The display apparatus 100 of FIG. 1 comprises a memory 110, a communication unit 120 and a main controller 130. The display apparatus 100 may be a monitor connected via a universal serial bus (USB) cable to an external apparatus, such as a computer, which requires booting. For example, the display apparatus 100 may be a USB monitor. Hereinafter, a computer will be used as an example of an external apparatus.

The memory 110 stores one or more images. A user may add or delete, or edit the images stored in the memory 110.

The communication unit 120 is connected to the computer via the USB cable, to receive command signals associated with booting the computer, and initial USB video signals, which are received from the computer after the computer has fully booted, according to a USB protocol.

If a specific command signal is received from the computer through the communication unit 120, the main controller 130 may determine that the computer is being booted, and may cause the image stored in the memory unit 110 to be displayed on a display panel (not shown). If the USB video signal is received from the computer after the computer has fully booted, the main controller 130 may process the USB video signal into a displayable signal to cause the displayable signal to be displayed on a display panel (not shown).

Accordingly, the display apparatus 100, the screen of which stays black while the computer is booting, may provide a user with the service of displaying a single pre-stored image, or the service of alternately or simultaneously displaying a plurality of pre-stored images.

Figure 2:
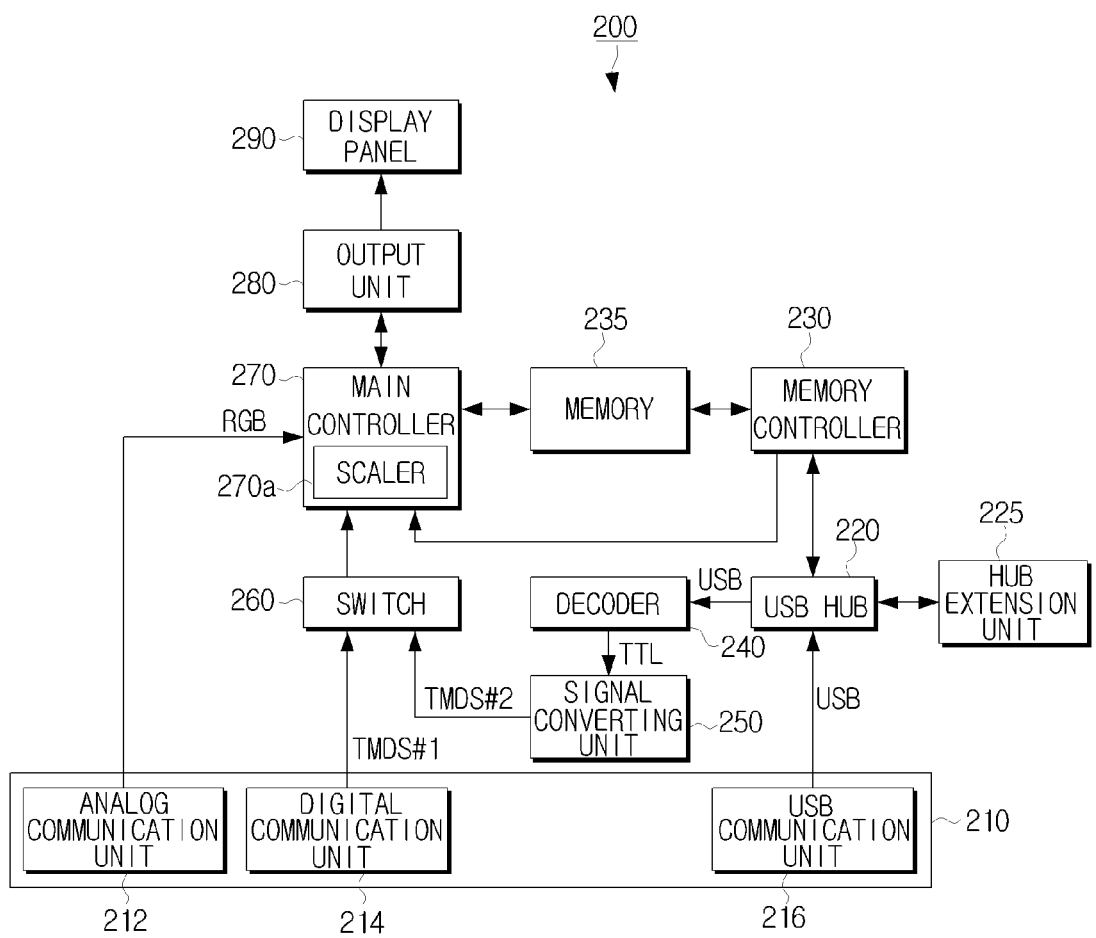
FIG. 2 is a block diagram schematically showing a display apparatus according to another exemplary embodiment of the present invention.

FIG. 2 is a block diagram schematically showing a display apparatus 200 according to another exemplary embodiment of the present invention.

The display apparatus 200 of FIG. 2 comprises a communication interface unit 210, a USB hub 220, a hub extension unit 225, a memory controller 230, a memory 235, a decoder 240, a signal converting unit 250, a switch 260, a main controller 270, an output unit 280 and a display panel 290.

The communication interface unit 210 provides an interface with the computer, and comprises an analog communication unit 212, a digital communication unit 214 and a USB communication unit 216.

The analog communication unit 212 receives analog video signals from the computer via a cable connected to the computer, to send the received analog video signals to the main controller 270. The analog video signals may be red (R), green (G) and blue (B) signals.

The digital communication unit 214 receives digital video signals from the computer, and sends the received digital video signals to the switch 260. The digital video signals may be transition minimized differential signaling (TMDS) #1 signals in a digital video interactive (DVI) format.

The USB communication unit 216 receives the command signals and USB video signals from the computer connected via the USB cable, and transfers the received signals to the USB hub 220.

The USB hub 220 provides the command signals received from the computer to the memory controller 230, and the USB video signals received from the computer to the decoder 240. The hub extension unit 225 is a down port functioning as an extension of the hub, and here, a plurality of hub extension units 225 may be included in the display apparatus 200.

The command signal is a signal to instruct the computer to open a specific file of the memory 235 when the computer is turned on and starts to boot. In more detail, if the booting of the computer is initiated, the computer may recognize the memory 235 connected via the USB hub 220 as a device such as a compact disc (CD)-read only memory (ROM). Accordingly, the memory controller 230 may receive a command to open a CD file of the USB driver stored in the memory 235 from the computer. Here, the CD file of the USB driver may be "*.img", and the command signal may be identical to a signal to open the CD-ROM during booting.

The USB video signal is a signal to display images provided by the computer when an operating system (OS) of the computer starts to activate after the computer is fully booted. The OS to operate the computer may be Windows, Linux or the like.

If the command signal is input from the USB hub 220, the memory controller 230 may notify the main controller 270 that the command signal has been input.

The memory 235 stores the driver of the display apparatus 200 which is compressed, and images and notification texts informing that the computer is being booted to be displayed while the computer is booting. The memory 235 may be a flash memory. While the computer is booting, the memory 235 receives the command signal from the computer to open a specific file recognized as a CD-ROM and previously stored in the memory 235.

The images and notification texts to be displayed while the computer is booting may be selected and changed by the user, and may be designated as defaults when the computer is manufactured. Specifically, if the computer is completely booted, the memory 235 may be set in the computer so that the memory 235 may be used as an external memory in the computer. Accordingly, the user may store a desired image in the memory 235 recognized as an external memory.

The decoder 240 decodes the USB video signal input from the computer after the computer has fully booted. For example, the decoder 240 may decode the USB video signal and output the decoded signal as a transistor-transistor logic (TTL) signal.

The signal converting unit 250 converts the decoded video signal received from the decoder 240 into a TMDS #2 signal, and sends the converted TMDS #2 signal to the switch 260.

If the video signal is being received from the digital communication unit 214, the switch 260 may provide a communication path between the digital communication unit 214 and the main controller 270. If the video signal is being received from the USB communication unit 216, the switch 260 may provide a communication path between the signal converting unit 250 and the main controller 270.

The main controller 270 processes the analog video signal input from the analog communication unit 212, the digital video signal received from the switch 260 or the USB video signal into displayable signals. A scaler 270a then scales the processed video signals. Specifically, if the OS of the computer operates normally after the computer has fully booted, the main controller 270 may receive the USB video signal from the computer and may process the received USB video signal while the driver of the monitor stored in the memory 235 communicates with decoder firmware stored in a memory (not shown) of the decoder 240. Accordingly, the main controller 270 may cause the images, which are displayed while the computer is booting, to be changed to the images transmitted from the computer, so that the images transmitted from the computer may be displayed on the display panel 290.

If a message notifying that the command signal has been received is received from the memory controller 230, the main controller 270 may determine whether the TMDS signal is received through the signal converting unit 250 and the switch 260. If it is determined that the TMDS signal is not received after the message has been received, the main controller 270 may determine that the computer is being booted.

Additionally, the main controller 270 may read the images stored in the memory 235 and process the read images into displayable signals.

The read images are images set to be displayed on the display panel 290 of the display apparatus 200 while the computer is booting. One selected from among the read images may be displayed on the display panel 290, or the plurality of read images may be alternately or simultaneously displayed on the display panel 290. Furthermore, the main controller 270 may read the text stored in the memory 235 and process the notification text informing that the computer is being booted to be displayed on the display panel 290.

The output unit 280 outputs the scaled video signal to the display panel 290 at high speed. To achieve this, the output unit 280 may output the video signal using a low voltage differential signaling (LVDS) technique. The LVDS technique enables the video signal to be transmitted to the display panel 290 via a copper line at high speed.

The display panel 290 displays the video signal output from the output unit 280 so that the user may view the video signal. For example, the display panel 290 may display images, notification texts or the like which are stored in the memory 235 and used during booting, and may also display the images transmitted from the computer after booting. The display panel 290 may be a liquid crystal display (LCD) panel.

Figure 3:
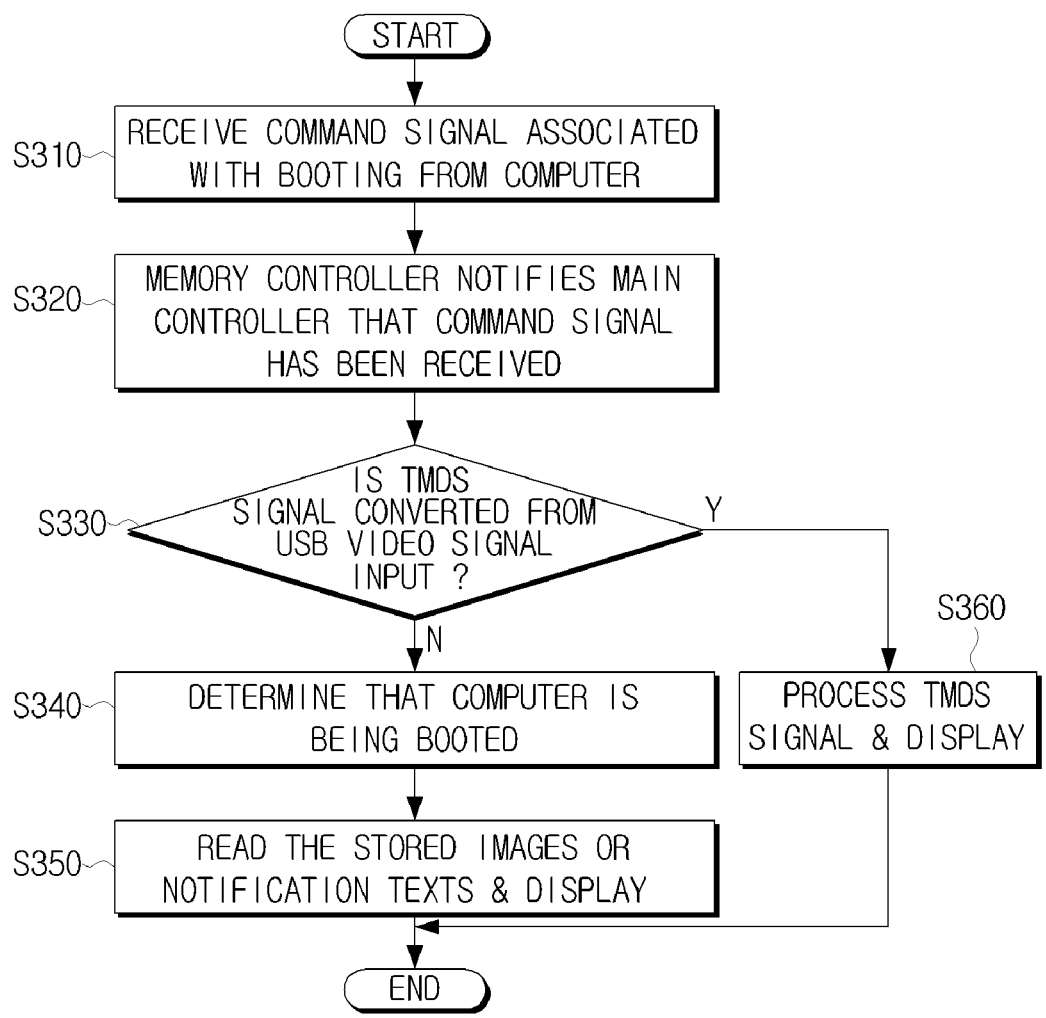
FIG. 3 is a flowchart explaining a method for displaying an image in the display apparatus shown in FIG. 2.

FIG. 3 is a flowchart explaining a method for displaying an image in the display apparatus 200 shown in FIG. 2.

Referring to FIGS. 2 and 3, if the command signal is received via the USB hub 220 (S310), the memory controller 230 may output the message notifying that the command signal has been received, to the main controller 270 (S320). The command signal received at operation S310 enables the memory controller 230 to open the driver file related to the USB monitor of the display apparatus 200 stored in the memory 235. For example, the command signal may be a command signal to open the CD file of the USB driver of the USB monitor (for example, an "*.img" file).

If the message is received from the memory controller 230, the main controller 270 may determine whether the TMDS signal is received through the switch 260 (S330). In more detail, the main controller 270 may check whether the USB video signal is input through the USB communication unit 216 and whether the TMDS signal converted by the signal converting unit 250 is received.

If it is determined that the TMDS signal is not received, that is, if the USB video signal is not received, the main controller 270 may determine that the computer is being booted (S340).

The main controller 270 may then read one or more images set to be displayed while the computer is booting from the memory 235, and may process the read images into displayable signals, so that the processed signals may be displayed on the display panel 290 (S350). In this situation, the main controller 270 may cause the notification text informing that the computer is being booted to be displayed together with the processed signals on the display panel 290.

Alternatively, if it is determined that the TMDS signal is received, the main controller 270 may process the TMDS signal, that is, the USB video signal provided by the computer, into a displayable signal, may scale the processed signal using the scaler 270a, and may cause the scaled signal to be displayed on the display panel 290 (S360).

According to the exemplary embodiment of the present invention as described above, if the main controller 270 determines that the TMDS signal is not received from the signal converting unit 250 after receiving the message notifying that the command signal has been received, the main controller 270 may determine that the computer is being booted, and may cause the images stored in the memory 235 to be displayed on the display panel 290. Additionally, the user may set the screen of the display apparatus 200 to remain black rather than to display the images stored in the memory 235 while the computer is booting. Such a menu for setting the display apparatus 200 may be provided via the interface.

In the USB monitor and a method by which the USB monitor displays images according to the exemplary embodiments of the present invention, it is possible to display images previously stored in the memory while the computer is being booted. Accordingly, while the computer is booting, the USB monitor may display images set by the user or images set during manufacture of the computer, instead of remaining black, so that there is no need to provide the user with a black screen. Additionally, the images displayed while the computer is booted may inform the user that the computer is being booted, so the user may not feel bored while waiting for the computer to fully boot.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
   a memory which stores one or more images;
   a communication unit which receives a universal serial bus (USB) video signal transmitted via a USB cable from an external apparatus, and receives a specific command signal from the external apparatus if the external apparatus starts to boot; and
   a main controller which determines that the external apparatus is being booted and causes the stored images to be displayed on a screen if the command signal is received through the communication unit.

2. The display apparatus as claimed in claim 1, further comprising:
   a decoder which decodes the video signal transmitted from the external apparatus; and
   a transition minimized differential signaling (TMDS) converting unit which converts the decoded video signal into a TMDS signal,
   wherein the main controller determines that the external apparatus is being booted if the TMDS signal is not received from the TMDS converting unit.

3. The display apparatus as claimed in claim 1, wherein the memory further stores a driver file of the display apparatus, further comprising a memory controller which provides the command signal transmitted from the external apparatus to the main controller if the command signal is a signal to open the stored driver file of the display apparatus.

4. The display apparatus as claimed in claim 1, wherein the images stored in the memory may be added and deleted.

5. The display apparatus as claimed in claim 1, wherein the memory stores a notification text informing that the external apparatus is being booted, and
   the main controller displays at least one of the images and the notification text on the screen if it is determined that the external apparatus is being booted.

6. A method for displaying an image in a display apparatus which displays a universal serial bus (USB) video signal transmitted via a USB cable from an external apparatus, the method comprising:

receiving a specific command signal from the external apparatus if the external apparatus starts to boot;

determining that the external apparatus is being booted, using the received command signal; and displaying a pre-stored image to be displayed on a screen.

7. The method as claimed in claim 6, wherein the determining comprises determining that the external apparatus is being booted, if a transition minimized differential signaling (TMDS) signal converted from the video signal is not received.

8. The method as claimed in claim 6, wherein the displaying comprises displaying at least one of the image and a pre-stored notification text on the screen.

9. The display apparatus as claimed in claim 1, wherein the images are selected or changed by a user.

10. The method as claimed in claim 6, wherein the images are selected or changed by a user.

* * * * *